(12) United States Patent
Zhang et al.

(10) Patent No.: US 11,054,698 B2
(45) Date of Patent: Jul. 6, 2021

(54) BACKLIGHT MODULE AND DISPLAY DEVICE

(71) Applicant: Wuhan China Star Optoelectronics Technology Co., Ltd., Hubei (CN)

(72) Inventors: Guiyang Zhang, Guangdong (CN); Guowei Zha, Guangdong (CN); Hongqing Cui, Guangdong (CN); Yong Yang, Guangdong (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 151 days.

(21) Appl. No.: 16/215,630

(22) Filed: Dec. 10, 2018

(65) Prior Publication Data

US 2019/0369442 A1 Dec. 5, 2019

Related U.S. Application Data

(63) Continuation of application No. PCT/CN2018/107449, filed on Sep. 26, 2018.

(30) Foreign Application Priority Data

May 31, 2018 (CN) .......................... 201810552647.3

(51) Int. Cl.
*G02F 1/13357* (2006.01)
*G02F 1/1335* (2006.01)

(52) U.S. Cl.
CPC .. *G02F 1/133606* (2013.01); *G02F 1/133516* (2013.01); *G02F 1/133603* (2013.01); *G02F 1/133607* (2021.01); *G02F 1/133614* (2021.01); *G02F 2202/28* (2013.01)

(58) Field of Classification Search
CPC ......... G02F 1/133516; G02F 1/133603; G02F 1/133606; G02F 1/133611; G02F 2001/133607; G02F 2001/133614; G02F 2202/28
See application file for complete search history.

(56) References Cited

U.S. PATENT DOCUMENTS

| | | | | |
|---|---|---|---|---|
| 5,566,007 A | * | 10/1996 | Ikeda | ................ G02F 1/133621 |
| | | | | 349/5 |
| 5,724,108 A | * | 3/1998 | Shibata | ................ G02B 6/0053 |
| | | | | 349/62 |
| 6,630,970 B2 | * | 10/2003 | Trapani | ............. G02F 1/133528 |
| | | | | 349/96 |

(Continued)

FOREIGN PATENT DOCUMENTS

| CN | 202995193 U | 6/2013 |
|---|---|---|
| JP | 2002350615 A | 12/2002 |

*Primary Examiner* — Tsion Tumebo

(57) ABSTRACT

The present disclosure discloses a backlight module and a display device. The light emission direction of at least one of the lamp source and the fluorescent film is provided with a diffusely reflecting layer. The diffusely reflecting layer arranged above the lamp source diffusely reflects pump light emitted from the lamp source, which may enhance uniformity of the pump light. The diffusely reflecting layer arranged above the fluorescent film scatters light emitted from the fluorescent film, scatters the light and distributes the light to a larger range, which may improve light mixing uniformity and improve the uniformity of light emission brightness.

19 Claims, 2 Drawing Sheets

(56) References Cited

U.S. PATENT DOCUMENTS

| | | | |
|---|---|---|---|
| 6,642,913 B1* | 11/2003 | Kimura | G02B 26/001 345/84 |
| 9,690,037 B2 | 6/2017 | Ham | |
| 9,810,942 B2* | 11/2017 | You | G02F 1/133609 |
| 9,939,680 B2* | 4/2018 | Cho | G02B 5/021 |
| 2006/0082700 A1 | 4/2006 | Gehlsen et al. | |
| 2006/0240286 A1 | 10/2006 | Park et al. | |
| 2006/0290253 A1* | 12/2006 | Yeo | G02B 5/0278 313/116 |
| 2008/0211984 A1* | 9/2008 | Sugibayashi | H01J 11/44 349/58 |
| 2009/0129055 A1* | 5/2009 | Morizawa | C09K 11/7787 362/97.1 |
| 2009/0180055 A1* | 7/2009 | Kim | G02F 1/133603 349/69 |
| 2009/0190072 A1* | 7/2009 | Nagata | G02B 6/0028 349/96 |
| 2010/0265694 A1* | 10/2010 | Kim | G02B 6/0068 362/97.1 |
| 2011/0110094 A1* | 5/2011 | Kashiwagi | G02B 5/223 362/293 |
| 2011/0116010 A1* | 5/2011 | Nagata | G02B 6/005 349/62 |
| 2011/0249215 A1* | 10/2011 | Jung | G02F 1/133611 349/61 |
| 2012/0113672 A1* | 5/2012 | Dubrow | G02B 6/0068 362/602 |
| 2012/0170253 A1* | 7/2012 | Park | G02F 1/133605 362/97.1 |
| 2013/0063964 A1* | 3/2013 | Meir | G02B 6/005 362/555 |
| 2013/0264538 A1* | 10/2013 | Oh | H01L 33/60 257/13 |
| 2014/0001501 A1* | 1/2014 | Park | H01L 25/0753 257/91 |
| 2014/0184960 A1* | 7/2014 | Yang | G02B 30/27 349/15 |
| 2015/0268492 A1* | 9/2015 | Hino | G02F 1/1336 349/61 |
| 2016/0070137 A1* | 3/2016 | You | G02F 1/133603 349/71 |
| 2017/0219883 A1* | 8/2017 | Yin | G02F 1/133605 |
| 2019/0094619 A1* | 3/2019 | Park | H01L 25/0753 |
| 2019/0346113 A1* | 11/2019 | Zhang | F21V 13/14 |

* cited by examiner

40

| 42 |
|---|

| 41 |
|---|

FIG. 4

BACKLIGHT MODULE AND DISPLAY DEVICE

CROSS-REFERENCE TO RELATED APPLICATIONS

The present application is a continuation-application of International (PCT) Patent Application No. PCT/CN2018/107449, filed on Sep. 26, 2018, which claims foreign priority of Chinese Patent Application No. 201810552647.3, filed on May 31, 2018 in the State Intellectual Property Office of China, the entire contents of which are hereby incorporated by reference.

TECHNICAL FIELD

The present disclosure relates to the field of display, and more particularly, to a backlight module and a display device.

BACKGROUND

In a mainstream backlight module, film layer structures such as a diffusion film and a prismatic lens (i.e., a brightness enhancement film, abbreviated as BEF) are arranged in a light emission direction of a light source to improve a light effect and a light mixing uniformity within a certain viewing angle range. However, in the process of actual use, the backlight module may still have a problem of light mixing nonuniformity within a visible area, which may causes nonuniformity of light emission brightness. When a display device having the backlight module displays a white screen of 255 gray levels, obvious brightness change may occur in different locations of the visible area, which has a serious effect on an overall display effect.

SUMMARY

On this account, the present disclosure provides a backlight module and a display device, which may enhance the light mixing uniformity and improve the uniformity of light emission brightness.

The backlight module according to an embodiment of the present disclosure includes a plurality of lamp sources, a fluorescent film, first diffusely reflecting layers positioned between the lamp sources and the fluorescent film, and second diffusely reflecting layers positioned in a light emission direction of the fluorescent film. The fluorescent film is positioned in a light emission direction of the lamp sources, the first diffusely reflecting layers are only arranged right above the lamp sources, and the second diffusely reflecting layers are positioned on the fluorescent film or inlaid into the fluorescent film.

The backlight module according to an embodiment of the present disclosure includes a plurality of lamp sources, a fluorescent film, and at least one diffusely reflecting layer. The fluorescent film is positioned in a light emission direction of the lamp sources, and the light emission direction of at least one of the lamp sources and the fluorescent film is provided with the diffusely reflecting layer.

Further, the backlight module may further include a filter film positioned between the lamp source and the fluorescent film. The lamp source is configured to emit first primary color light. A fluorescent medium in the fluorescent film emits second primary color light and third primary color light when being excited by the first primary color light. Both a wavelength of the second primary color light and a wavelength of the third primary color are greater than that of the first primary color light. The filter film allows the first primary color light to pass through to reflect the second primary color light and the third primary color light.

In a display device according to an embodiment of the present disclosure, the backlight module of the display device includes a plurality of lamp sources, a fluorescent film, and at least one diffusely reflecting layer. The fluorescent film is positioned in a light emission direction of the lamp sources, and the light emission direction of at least one of the lamp sources and the fluorescent film is provided with the diffusely reflecting layer.

Beneficial effects of the present disclosure are as below: the light emission direction of at least one of the lamp source and the fluorescent film is provided with a diffusely reflecting layer. The diffusely reflecting layer arranged above the lamp source diffusely reflects pump light emitted from the lamp source, such that light rays may relatively uniformly enter the fluorescent film, and thus uniformity of the pump light is enhanced. The diffusely reflecting layer arranged above the fluorescent film scatters light emitted from the fluorescent film, scatters the light and distributes the light to a larger range, which may improve light mixing uniformity and improve the uniformity of light emission brightness. Furthermore, a filter film is additionally arranged between the lamp source and the fluorescent film. The filter film allows the first primary color light having a shorter wavelength to pass through to reflect the second primary color light and the third primary color light having a longer wavelength, so as to prevent the second primary color light and the third primary color light from being propagated into a drive substrate and a reflecting layer and from being absorbed by the drive substrate and the reflecting layer, thereby enhancing the light effect.

BRIEF DESCRIPTION OF THE DRAWINGS

FIG. 4 is a schematic structural diagram of a display device according to an embodiment of the present disclosure.

DETAILED DESCRIPTION

A primary objective of the present disclosure is as below: the light emission direction of at least one of the lamp source and the fluorescent film is provided with a diffusely reflecting layer. The diffusely reflecting layer arranged above the lamp source diffusely reflects pump light emitted from the lamp source, such that light rays may relatively uniformly enter the fluorescent film, and thus uniformity of the pump light is enhanced. The diffusely reflecting layer arranged above the fluorescent film scatters light emitted from the fluorescent film, scatters the light and distributes the light to a larger range, which may improve light mixing uniformity and improve the uniformity of light emission brightness.

Technical solutions in each of the embodiments of the present disclosure are clearly and completely described below with reference to the accompanying drawings. The following embodiments and technical features thereof may be combined with each other on a non-conflict basis. Furthermore, directional terms such as "above" and "beneath" are used herein to better describe each of the embodiments but are not intended to limit the scope of protection of the present disclosure.

Figure 1:
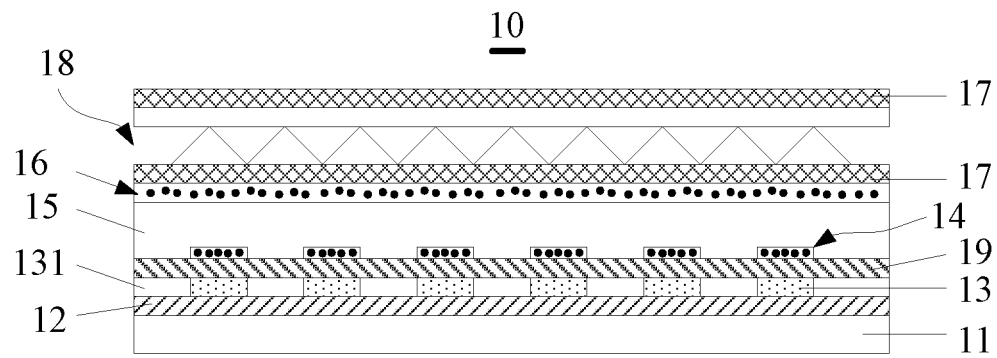
FIG. 1 is a schematic structural cross-section view of a backlight module according to a first embodiment of the present disclosure.

FIG. 1 is a schematic structural cross-section view of a backlight module according to an embodiment of the present disclosure. Referring to FIG. 1, the backlight module 10 may include a drive substrate 11 and layer structures arranged on the drive substrate 11. The layer structures arranged on the drive substrate 11 may include a reflecting layer 12, a plurality of lamp sources 13, a first diffusely reflecting layer 14, a fluorescent film 15, and a second diffusely reflecting layer 16.

The drive substrate 11 may be regarded as a back plate of the backlight module 10, and not only may be configured to support the above structural elements of the backlight module 10, but also may arrange a wire for driving the plurality of lamp sources 13 to emit light.

The reflecting layer 12 is arranged on the drive substrate 11, and an upper surface of the reflecting layer 12 may reflect light.

The plurality of lamp sources 13 may be positioned on the same layer. Specifically, the plurality of lamp sources 13 may be arranged in a planar layer 131. An upper surface of the planar layer 131 may be a plane for ease of bonding a filter film 18. The plurality of lamp sources 13 may be connected to a drive circuit and may emit light having predetermined color such as blue light under the drive of the drive circuit. The lamp sources 13 may be LEDs, and the drive circuit may be a printed circuit board (PCB) carried on the drive substrate 11.

The fluorescent film 15 may be positioned in a light emission direction of the lamp sources 13. The first diffusely reflecting layer 14 may be positioned on an upper side of the fluorescent film 15, and the second diffusely reflecting layer 16 may be positioned on a lower side of the fluorescent film 15. The first diffusely reflecting layer 14 may be positioned in the light emission direction of the lamp sources 13, and the second diffusely reflecting layer 16 may be positioned in the light emission direction of the fluorescent film 15.

The first diffusely reflecting layer 14 may be a layer structure having a predesigned pattern and merely covered right above the lamp source 13 instead of an entire surface structure. Methods for fabricating the first diffusely reflecting layer 14 in the present disclosure may include but may be not limited to a method I and a method II. The method I may include: forming an entire transparent dielectric layer having a thickness of 0.3 µm~5 µm and containing a particle that may diffusely reflect light, for example polyethylene terephthalate (PET), polycyclohexylenedimethylene terephthalate (PCT), poly(methyl methacrylate) (PMMA), or silicon dioxide ($SiO_2$) and so on, wherein a particle size of the particle may be 0.1 µm~1 µm; etching the transparent dielectric layer to retain merely the portion of the transparent dielectric layer right above the lamp source 13, with the remaining portion removed, wherein the remaining portion of the transparent dielectric layer may be the first diffusely reflecting layer 14. The method II may include directly forming the first diffusely reflecting layer 14 by using a mask and using the same material as used in the method I.

According to the present disclosure, after the first diffusely reflecting layer 14 is fabricated, the fluorescent film 15 may be fabricated by way of thermocompression bonding. The material for fabricating the fluorescent film 15 may be in a molten state at a high temperature (<300° C.).

Therefore, the finally fabricated fluorescent film 15 may come into close contact with the first diffusely reflecting layer 14. At this moment, the first diffusely reflecting layer 14 may be regarded as being inlaid into the fluorescent film 15. A refractive index of the first diffusely reflecting layer 14 may be different from that of the fluorescent film 15, and the more greatly the refractive index of the first diffusely reflecting layer 14 may differ from that of the fluorescent film 15, the more obvious the diffuse reflection and scattering effects of the first diffusely reflecting layer 14 are.

Further referring to FIG. 1, the second diffusely reflecting layer 16 may be positioned on the fluorescent film 15. That is, the second diffusely reflecting layer 16 and the fluorescent film 15 may be separate film layer structures. This may be equivalent to a fact that a layer of air gap clearance is arranged above the fluorescent film 15. Therefore, backlight uniformity may be enhanced, and meanwhile granular sensation of the LED serving as the lamp source 13 may be reduced. Of course, in the present disclosure, the second diffusely reflecting layer 16 also may be inlaid into the fluorescent film 15. Hereupon, the second diffusely reflecting layer 16 may be regarded as a portion of the fluorescent film 15, and the sum of the thicknesses may be equal to the thickness of the fluorescent film 15. In the present disclosure, the second diffusely reflecting layer 16 may be the same as the first diffusely reflecting layer 14 in manufacturing material, thickness and manufacturing method, which are not described in detail herein. The difference lies in that, as shown in FIG. 1, the second diffusely reflecting layer 16 may be an entire surface structure, which is advantageous to uniform bonding of upper layer films such as the diffusion film 17 and the prismatic lens 18. One lamp source 13 may correspond to a plurality of vertex angles of the prismatic lens 18. That is, above the operation region of the lamp source 13 there may be provided with a plurality of vertex angles of the prismatic lens 18.

It is to be understood that the backlight module 10 of the present disclosure further may include other structural elements, for example, two diffusion films 17 and one prismatic lens 18. One diffusion film 17 may be arranged on the fluorescent film 15, the prismatic lens 18 may be arranged on this diffusion film 17, and the other diffusion film 17 may be arranged on the prismatic lens 18. Reference may be made to the prior art for arrangement modes and working principles of these structural elements.

In this embodiment, the first diffusely reflecting layer 14 diffusely may reflect light (pump light) emitted from the lamp source 13, such that light rays may relatively uniformly enter the fluorescent film 15, and thus uniformity of the pump light may be enhanced. The second diffusely reflecting layer 16 may scatter light emitted from the fluorescent film 15, and may scatter and distribute the light to a larger range, which may further improve backlight uniformity.

Figure 2:
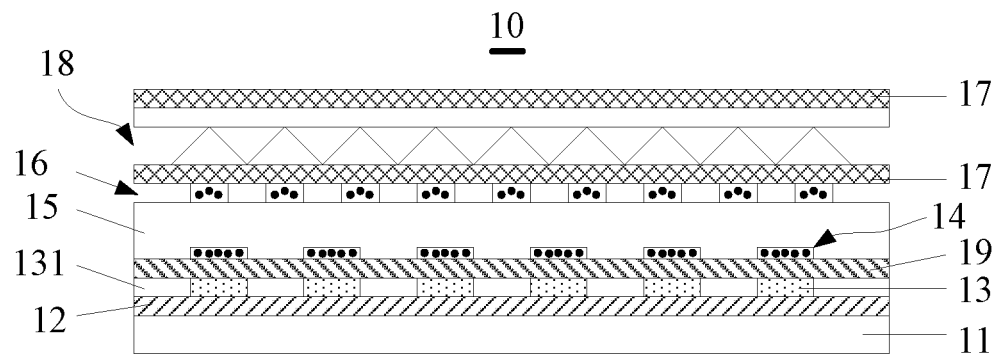
FIG. 2 is a schematic structural cross-section view of a backlight module according to a second embodiment of the present disclosure.
Figure 3:
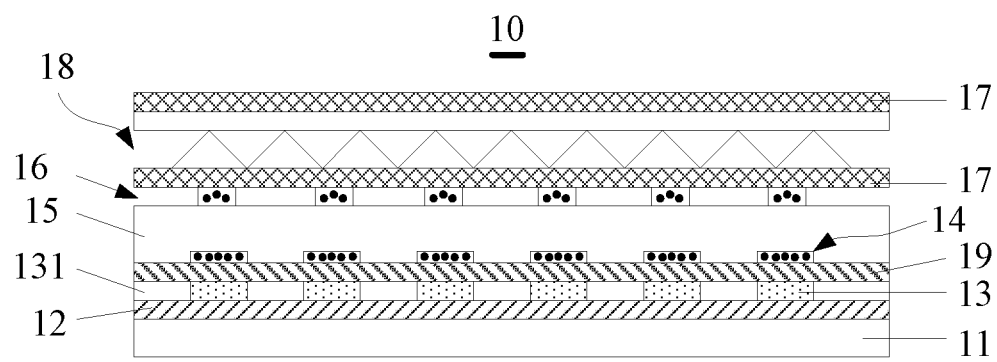
FIG. 3 is a schematic structural cross-section view of a backlight module according to a third embodiment of the present disclosure.

Based on the working principles, in other embodiments of the present disclosure, the second diffusely reflecting layer 16 also may a layer structure having a predesigned pattern instead of an entire surface structure. For example, as shown in FIG. 2, the second diffusely reflecting layer 16 may be merely arranged below a vertex angle of the prismatic lens 18. That is, the second diffusely reflecting layer 16 may be arranged adjacent to a bisector of the vertex angle of the prismatic lens 18. For another example, as shown in FIG. 3, the second diffusely reflecting layer 16 also may be only arranged right above the lamp source 13.

Further referring to FIG. 1, the backlight module 10 also may be provided with a filter film 19. The filter film 19 and the fluorescent film 15 may be sequentially arranged in the light emission direction of the lamp source 13. The fluorescent film 15 may have a refractive index of 1.5~1.8 and a thickness of 100 μm~500 μm. The fluorescent film 15 may be formed mixedly by a fluorescent medium (also referred to as a photoluminescent particle), a haze particle, and an adhesive glue (for example, silica gel), etc. Furthermore, the light mixing uniformity and the wavelength of light emitted from the fluorescent film 15 may be fine-tuned by controlling the proportion between the fluorescent medium and the haze particle. The fluorescent medium may emit light having a longer wavelength when the fluorescent medium is excited by light having a shorter wavelength. Specifically, when the light emitted from the lamp source 13 is regarded as first primary color light, the fluorescent medium may emit second primary color light and third primary color light when the fluorescent medium is excited by the first primary color light, and both the wavelength of the second primary color light and the wavelength of the third primary color may be greater than that of the first primary color light. The filter film 19 may be positioned between the lamp source 13 and the fluorescent film 15, and the filter film 19 may allow the first primary color light to pass through to reflect the second primary color light and the third primary color light. To implement this objective, in the present disclosure, inorganic materials such as tantalum pentoxide ($Ta_2O_5$) or titanium dioxide ($TiO_2$) may be used, or organic materials such as transparent resin may be used to fabricate the filter film 19. Of course, the present disclosure is not limited thereto. Furthermore, in the present disclosure, based on different materials, the filter film 19 may be fabricated in suitable way, for example, by way of vacuum evaporation, deposition, magnetron sputtering or thermocompression bonding, etc. Specifically, in the present disclosure, the filter film 19 may be formed by using $Ta_2O_5$ or $TiO_2$ by way of sputtering or evaporation, or the filter film 19 may be formed by using transparent resin by way of thermocompression bonding. The thickness of the filter film 19 may be 1 μm~10 μm.

In the operation process of the backlight module 10, the filter film 19 may block the second primary color light and the third primary color light from propagating toward the reflecting layer 12, but may only allow the second primary color light and the third primary color light to propagate toward the light emission direction of the backlight module 10. In this way, the second primary color light and the third primary color light may be prevented from being propagated to the drive substrate 11 and the reflecting layer 12 and may be prevented from being absorbed by the drive substrate 11 and the reflecting layer 12. Therefore, the light effect may be improved.

Taking an example in which the lamp source 13 is a blue light LED, when blue light (regarded as the first primary color light) is propagated to the fluorescent film 15, the fluorescent medium in the fluorescent film 15 may be excited and may emit red light (regarded as the second primary color light) and green light (regarded as the third primary color light). Reflected by the filter film 19, the red light and the green light may be only propagated to the light emission direction of the backlight module 10, whereas a portion of the blue light may be propagated to the light emission direction of the backlight module 10, and the other portion of blue light may be propagated to the reflecting layer 12 by the filter film 19. For the blue light propagated to the reflecting layer 12, a portion of the blue light may be absorbed by the reflecting layer 12 and the drive substrate 11, and the remaining portion of the blue light may be reflected by the reflecting layer 12 and may be further propagated to the fluorescent film 15 to continue exciting the fluorescent medium to emit the red light and the green light, which may further improve the light effect.

Figure 4:
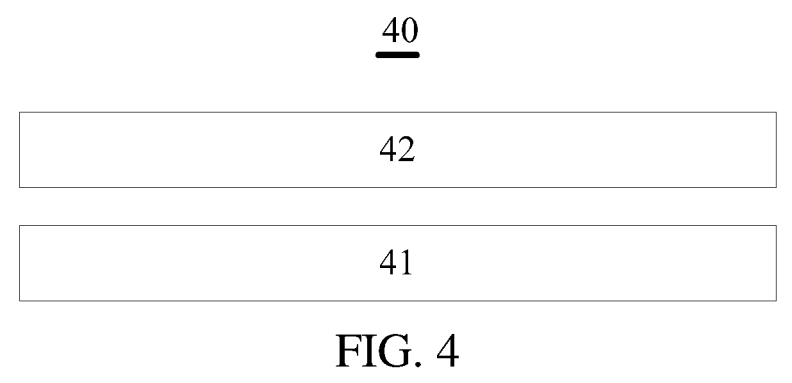

The present disclosure also provides a display device. As shown in FIG. 4, the display device 40 may include a backlight module 41 and a liquid crystal display panel 42 arranged in the light emission direction of the backlight module 41. The backlight module 41 may be the backlight module 10 according to any one of foregoing embodiments. Therefore, the display device 40 may also have the beneficial effects of the backlight module 10.

It is to be explained again that the above are merely embodiments of the present disclosure and are not intended to limit the patent scope of the present disclosure. Any modifications of equivalent structure or equivalent process, such as mutual combination of technical features of the embodiments, made on the basis of the contents of the description and accompanying drawings of the present disclosure or directly or indirectly applied to other related technical fields shall similarly fall within the scope of patent protection of the present disclosure.

What is claimed is:

1. A backlight module, comprising a plurality of lamp sources, a fluorescent film, a plurality of first diffusely reflecting layers positioned between the plurality of lamp sources and the fluorescent film, and a plurality of second diffusely reflecting layers positioned in a light emission direction of the fluorescent film; wherein the fluorescent film is positioned in a light emission direction of the plurality of lamp sources, each of the plurality of first diffusely reflecting layers are only arranged right above one of the plurality of lamp sources, and the plurality of second diffusely reflecting layers are positioned on the fluorescent film or inlaid into the fluorescent film; wherein the plurality of second diffusely reflecting layers are spaced apart; and a part of light emitted from the fluorescent film passes through a space between two of the adjacent second diffusely reflecting layers;

wherein each of the plurality of first diffusely reflecting layers and each of the plurality of lamp sources, have a same width.

2. The backlight module according to claim 1, wherein the fluorescent film is formed on the plurality of first diffusely reflecting layers by way of thermocompression bonding.

3. The backlight module according to claim 1, further comprising a plurality of prismatic lens positioned in the light emission direction of the fluorescent film, wherein each of the plurality of second diffusely reflecting layers is arranged below a vertex angle of one of the plurality of prismatic lens.

4. The backlight module according to claim 1, wherein each of the plurality of second diffusely reflecting layers is only arranged right above one of the plurality of lamp source.

5. The backlight module according to claim 1, further comprising a filter film positioned between the plurality of lamp sources and the fluorescent film, wherein the plurality of lamp sources is configured to emit first primary color light, a fluorescent medium in the fluorescent film emits second primary color light and third primary color light when the fluorescent medium in the fluorescent film is excited by the first primary color light, both a wavelength of the second primary color light and a wavelength of the third primary color are greater than that of the first primary color light, and the filter film allows the first primary color light to pass through to reflect the second primary color light and the third primary color light.

6. A backlight module, comprising a plurality of lamp sources, a fluorescent film, a plurality of first diffusely reflecting layers positioned between the plurality of lamp sources and the fluorescent film, and a plurality of second diffusely reflecting layers positioned in a light emission direction of the fluorescent film; wherein the fluorescent film is positioned in the light emission direction of the plurality of lamp sources; the plurality of second diffusely reflecting layers are spaced apart; and a part of light emitted from the fluorescent film passes through a space between two of the adjacent second diffusely reflecting layers;

wherein each of the plurality of first diffusely reflecting layers and each of the plurality of lamp sources, have a same width.

7. The backlight module according to claim 6, wherein each of the plurality of first diffusely reflecting layers is only arranged right above one of the plurality of lamp sources.

8. The backlight module according to claim 7, wherein the fluorescent film is formed on the plurality of first diffusely reflecting layers by way of thermocompression bonding.

9. The backlight module according to claim 6, wherein the plurality of second diffusely reflecting layers is positioned on the fluorescent film or inlaid into the fluorescent film.

10. The backlight module according to claim 9, further comprising a plurality of prismatic lens positioned in the light emission direction of the fluorescent film, wherein each of the plurality of second diffusely reflecting layers is arranged below a vertex angle of one of the plurality of prismatic lens.

11. The backlight module according to claim 9, wherein each of the plurality of second diffusely reflecting layers is only arranged right above one of the plurality of lamp sources.

12. The backlight module according to claim 6, further comprising a filter film positioned between the plurality of lamp sources and the fluorescent film, wherein the plurality of lamp sources is configured to emit first primary color light, a fluorescent medium in the fluorescent film emits second primary color light and third primary color light when the fluorescent medium in the fluorescent film is excited by the first primary color light, both a wavelength of the second primary color light and a wavelength of the third primary color are greater than that of the first primary color light, and the filter film allows the first primary color light to pass through to reflect the second primary color light and the third primary color light.

13. The backlight module according to claim 9, wherein a material for manufacturing the filter film comprises one of tantalum pentoxide ($Ta_2O_5$), titanium dioxide ($TiO_2$) and transparent resin.

14. A display device, comprising a backlight module, the backlight module comprising a plurality of lamp sources, a fluorescent film, a plurality of first diffusely reflecting layers positioned between the plurality of lamp sources and the fluorescent film, and a plurality of second diffusely reflecting layers positioned in a light emission direction of the fluorescent film; wherein the fluorescent film is positioned in the light emission direction of the plurality of lamp sources; the plurality of second diffusely reflecting layers are spaced apart; and a part of light emitted from the fluorescent film passes through a space between two of the adjacent second diffusely reflecting layers;

wherein each of the plurality of first diffusely reflecting layers and each of the plurality of lamp sources, have a same width.

15. The display device according to claim 14, wherein each of the plurality of first diffusely reflecting layers is only arranged right above one of the plurality of lamp sources.

16. The display device according to claim 14, wherein the plurality of second diffusely reflecting layers is positioned on the fluorescent film or inlaid into the fluorescent film.

17. The display device according to claim 16, wherein the backlight module further comprises a plurality of prismatic lens positioned in the light emission direction of the fluorescent film, and each of the plurality of second diffusely reflecting layers is arranged below a vertex angle of one of the plurality of prismatic lens.

18. The display device according to claim 16, wherein each of the plurality of second diffusely reflecting layers is only arranged right above one of the plurality of lamp source.

19. The display device according to claim 14, wherein the backlight module further comprises a filter film positioned between the plurality of lamp sources and the fluorescent film, wherein the plurality of lamp sources is configured to emit first primary color light, a fluorescent medium in the fluorescent film emits second primary color light and third primary color light when the fluorescent medium in the fluorescent film is excited by the first primary color light, both a wavelength of the second primary color light and a wavelength of the third primary color are greater than that of the first primary color light, and the filter film allows the first primary color light to pass through to reflect the second primary color light and the third primary color light.

* * * * *